United States Patent [19]

Sealey et al.

[11] Patent Number: 4,560,123
[45] Date of Patent: Dec. 24, 1985

[54] DOOR LOCKING MECHANISM

[75] Inventors: Francis Sealey, Bellevue; Richard H. Weiland, Seattle, both of Wash.

[73] Assignee: The Boeing Company, Seattle, Wash.

[21] Appl. No.: 444,400

[22] PCT Filed: Sep. 30, 1982

[86] PCT No.: PCT/US82/01389
§ 371 Date: Sep. 30, 1982
§ 102(e) Date: Sep. 30, 1982

[87] PCT Pub. No.: WO84/01340
PCT Pub. Date: Apr. 12, 1984

[51] Int. Cl.$^4$ .............................................. B64C 1/14
[52] U.S. Cl. ................................... 244/129.5; 49/254; 49/201
[58] Field of Search ................. 244/DIG. 2; 292/300, 292/DIG. 49; 49/254, 255, 256, 248, 249, 201; 296;56/

[56] References Cited

U.S. PATENT DOCUMENTS

| 2,531,263 | 11/1950 | Fink et al. ......................... 244/129.5 |
| 2,670,799 | 3/1954 | Dobbs .................................... 166/14 |
| 2,748,855 | 6/1956 | Siems et al. ........................... 160/210 |
| 2,997,751 | 8/1961 | McPherren ...................... 244/129.5 |
| 2,997,751 | 8/1961 | McPherren ............................. 20/16 |
| 3,051,280 | 8/1962 | Bergman et al. ..................... 189/46 |
| 3,085,297 | 4/1963 | Linderfelt ............................... 20/16 |
| 3,506,223 | 4/1970 | Flemming ............................ 244/129 |
| 3,585,757 | 6/1971 | Ritchie et al. ......................... 49/215 |
| 3,647,169 | 3/1972 | Allwright et al. ................... 244/129 |
| 3,718,171 | 2/1973 | Godwin ............................ 244/129.5 |
| 3,791,073 | 2/1974 | Baker ...................................... 49/249 |
| 3,990,739 | 11/1976 | Head ....................................... 296/56 |
| 4,199,120 | 4/1980 | Bergman et al. ................. 244/129.5 |

FOREIGN PATENT DOCUMENTS 637243 2/1962 Canada ............................. 244/129.5

Primary Examiner—Sherman Basinger
Assistant Examiner—Rodney Corl
Attorney, Agent, or Firm—Morris A. Case; Bernard A. Donahue

[57] ABSTRACT

A four bar linkage, between a hinge carriage segment and a translating door segment, of an outward opening overhead rotation plug type aircraft door, defines the relative movement between the two segments. A door handle actuates linkages that extend between the two segments to power the relative movement. When the handle is in either the down and the door locked position, or in the up and unlocked ready for outward rotation position, the linkage is overcenter so that the handle remains in position. A safety link extends between the two segments to provide fail safe locking at either handle position.

6 Claims, 5 Drawing Figures

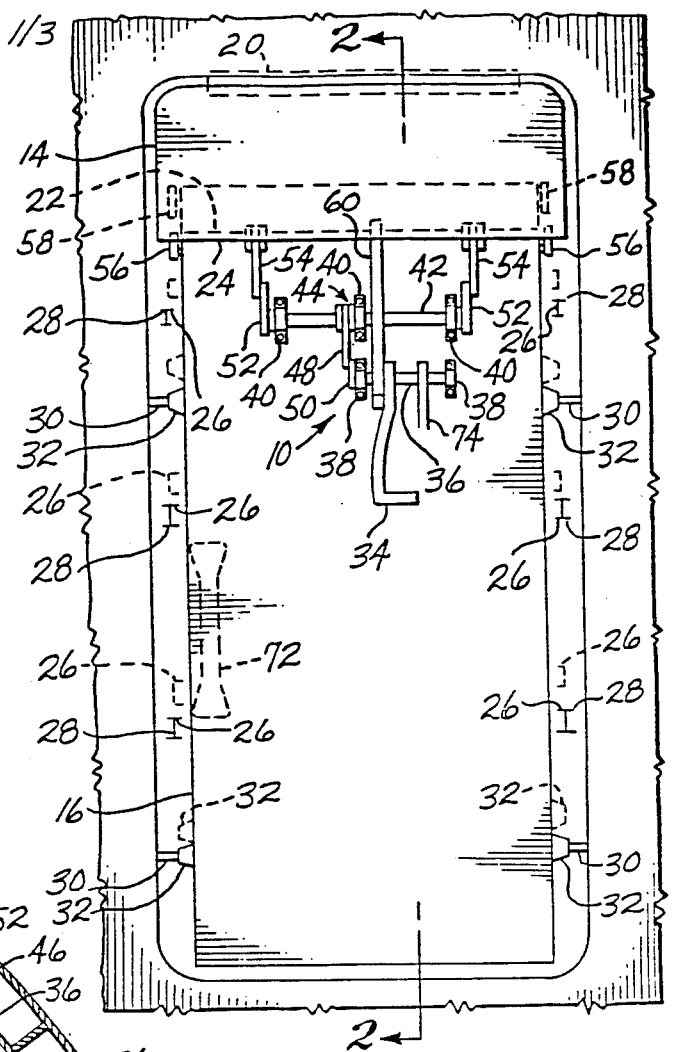
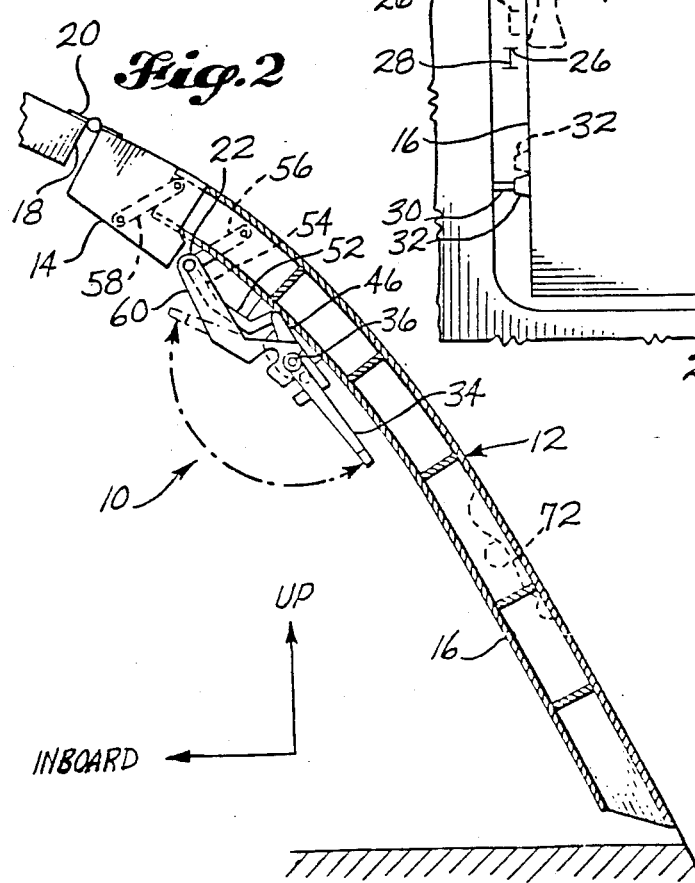

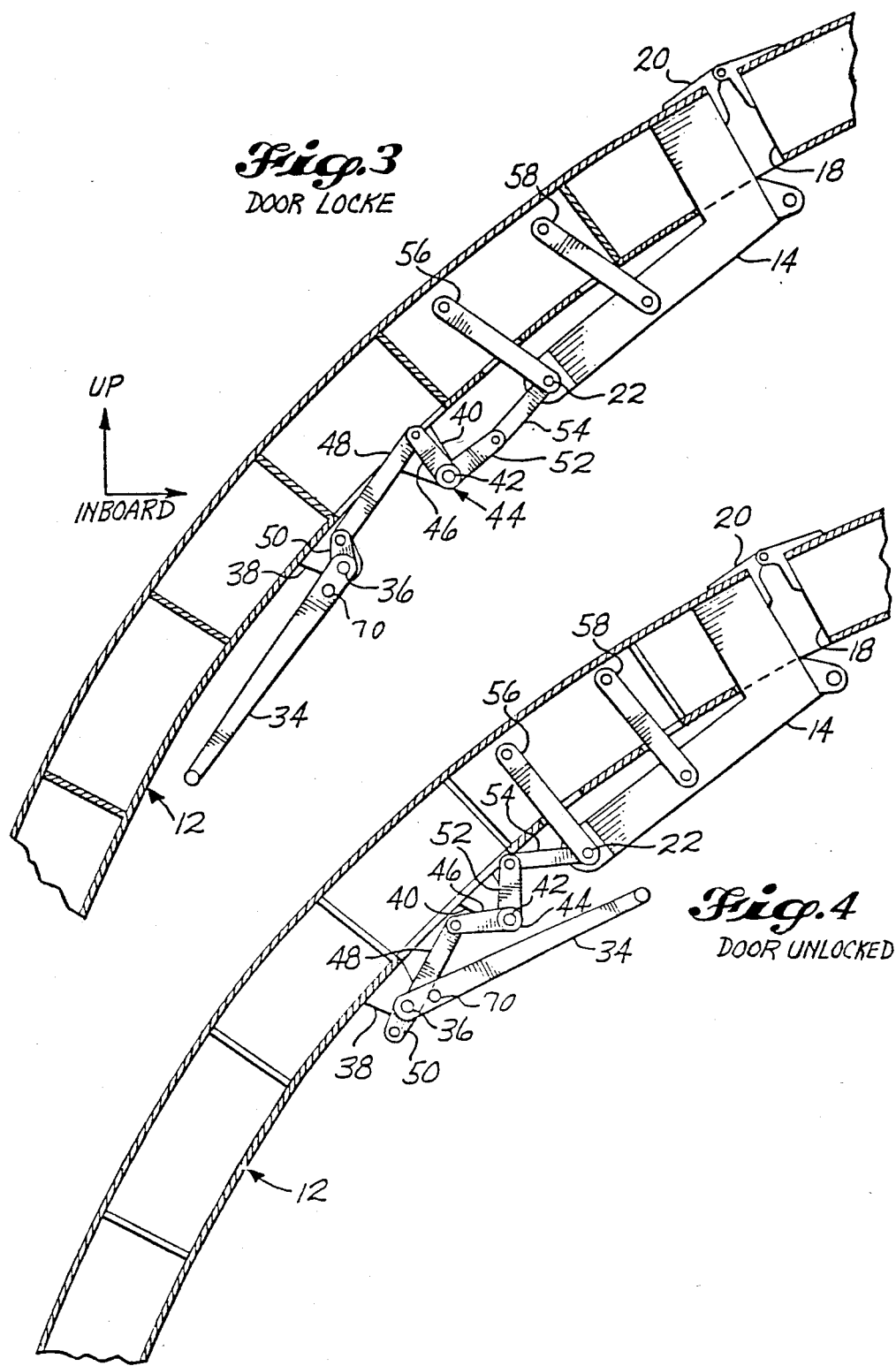

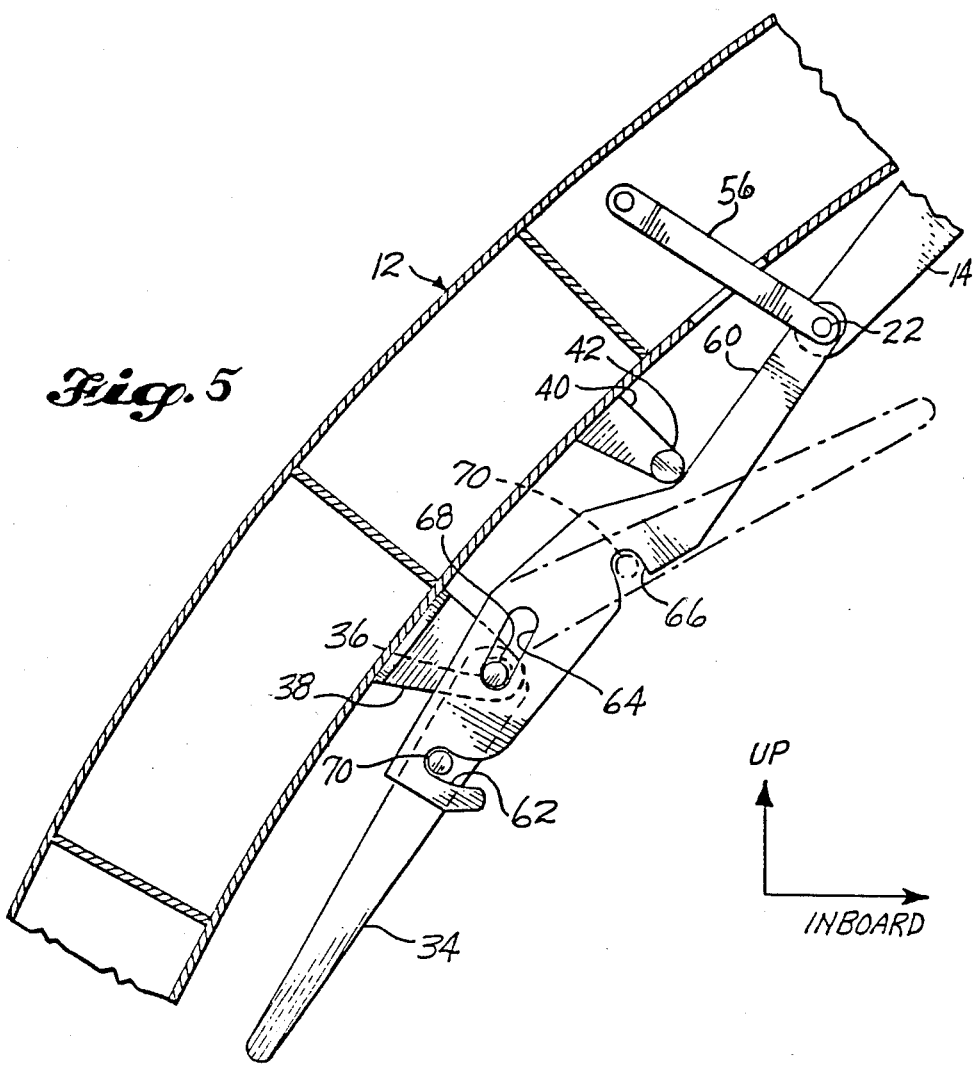

DOOR LOCKING MECHANISM

SUMMARY OF THE INVENTION

An outward opening top hinged plug type aircraft door has a two segment door with the segments moving relative to each other between the door closed and locked position and the door unlocked and ready to be rotated outward position. The interior door handle for moving the door segment between these two positions operates linkages that gives fail safe locking of the mechanism at either position.

DESCRIPTION OF THE DRAWINGS

FIG. 1 shows a fragmented side elevational view from the inside of an aircraft door with the locking mechanism of this invention.

FIG. 2 shows a cross-sectional view taken along line 2—2 of FIG. 1.

FIG. 3 shows a blown-up fragmented cross-sectional view, taken from the opposite direction, of the linkage of the locking mechanism in the door closed position.

FIG. 4 shows a view as in FIG. 3 with the locking mechanism in the door open position.

FIG. 5 shows a fragmented blown-up cross-sectional side elevational view of the fail safe feature of the locking mechanism.

DETAILED DESCRIPTION

A door locking mechanism 10 is used to control an outward opening, overhead pivoting, plug type aircraft door 12. The door is in two segments with a hinge carriage segment 14, and a translating door segment 16. The hinge carriage segment is secured to the lintel 18, above the door opening with a hinge 20. A torque tube 22 is secured to extend along the edge 24 of the hinge carriage segment. The translating door segment is mounted to be moved toward and away from the hinge carriage segment, with the door closed, sealed and locked when the segments are moved apart, and unlocked and ready to be rotated outward, when the segments are moved toward each other. FIG. 1 shows the door in the closed position. When in that position, door mounted stops 26 abut against side frame mounted stops 28. The stops in combination with guide rollers 30 in the side frames and cam fittings 32 in the door keep the door closed at pressure differentials encountered in flight. The door mounted stops and cam fittings move upward when the door segments are moved toward each other and clear the stops and cam fittings in the frame as shown in phantom lines in FIG. 1.

The door locking mechanism 10 provides for movement of the translating door segment 12, as well as for locking it. The segment translation is initiated by an inside door handle 34, that is secured to a shaft 36, which freely rotates, in response to door handle movement, in a pair of pillow blocks 38 that are mounted to the translating door segment. A set of three pillow blocks 40 are mounted to the translating door segment, and hold a freely rotatable shaft 42. A bellcrank 44 is mounted to the shaft. The bellcrank has an arm 46, which pivotally joins to linkage 48, which in turn is pivotally joined to an offset link 50, which is secured to the shaft 36. This offset link and the handle are joined to the shaft in a manner to maintain the same angle at all positions of the handle. The other arm 32, of the bellcrank, is actually a pair of arms secured to the shaft 42, and located to pivotally engage a pair of linkages 54, which in turn are pivotally mounted to torque tube 22. A set of guide links 56 are pivotally mounted at one end to the torque tube 22, and the other end is pivotally mounted to the translating door segment. A separate guide link is located near each end of the torque tube. A separate set of guide links 58 are mounted parallel to the first set and are pivotally mounted to extend between the two door segments. This mounting of the guide links acts as a four-bar linkage along each side of the door to move the translating door segment upward and inward as the door handle is raised. The linkage to the door handle is such that the handle is overcenter at the door closed and locked position, and also at the door unlocked and raised ready to be pivoted open position, to prevent unwanted movement at either position. A completely fail safe safety link 60 is also provided to prevent unwanted movement of the door at either position even if some of the actuating linkages fail. This safety link, as is best shown in FIG. 5, is joined at one end to the hinge carriage segment at the torque tube 22. At the other end it is connected to the translating door segment through shaft 36. This connection to shaft 36 is accomplished by a combination of slots 62, 64 and 66 in the safety link and extensions 68, on the end of the shaft 36, and extensions 70, located on the interior door handle. The slot 64 is extended lengthwise to provide for the movement of the translating door segment.

In operation, the closed and locked door is unlocked and the translating door segment 12 moved inward and upward to free stops 26 on the door from stops 28 and guide rollers 30 on the door frame by rotating the interior door handle 34 upward. This handle acts through the linkages to move the two segments toward each other. This unlocking and movement may also be actuated by use of the outside door handle 72. This is accomplished through linkages, not shown, that act through link 74.

We claim:

1. A mechanism for locking of a top hinged outward opening plug type aircraft door comprising: a door carriage segment hingedly secured to a lintel of an aircraft door opening, a translating door segment having means along the sides to act in conjunction with cooperating means on door frames for holding the door closed when in the locked position, four bar linkages along each side to join the two door segments together, handle actuated linkages to join the two segments together to move the translating segment between a door locked position to a door unlocked and raised upward and inward position ready for outward opening, and the linkage arranged to place the handle over center at each of the two positions.

2. A mechanism for locking of a top hinged outward opening plug type aircraft door as in claim 1 further comprising: means for locking the door segments in position even if any component of the locking mechanism fails.

3. A mechanism for locking of a top hinged outward opening plug type aircraft door as in claim 2, wherein the means for locking the door segments in position comprises: a safety link joined to the hinge carriage segment of the door and having an elongated slot and a pair of recesses along one side and adjacent the slot, a pin mounted at the axis of the handle to extend into the slot, and a pin mounted on the arm of the handle and located to mate into a recess at each extended position of the handle.

4. A mechanism for locking of a top hinged outward opening plug type aircraft door comprising: a hinge carriage segment of an outward opening plug type aircraft door hingedly jointed to the lintel above, a translating door segment, a pair of parallel and pivotally mounted guide links along each side of the door and joining the two segments of the door together in a four bar linkage arrangement, a bellcrank and linkage extending between the two segments of the door for moving the two segments relative to each other, a handle pivotally mounted to the translating door segment and having a link connecting to the bellcrank for providing actuation for movement of the translating door segment between a closed position and an unlocked and ready for outward rotation position, and means for locking the handle in either position to prevent relative movement between the door segments.

5. A mechanism for locking of a top hinged outward opening plug type aircraft door as in claim 4 wherein the means for locking the handle comprises the linkage placing the handle overcenter at each extreme position.

6. A mechanism for locking of a top hinged outward opening plug type aircraft door as in claim 4 wherein the means for locking the handle in either position comprises a safety link extending between the two door segments with the safety link joined to the hinge carriage segment, and having a series of recesses to accept a pin on the handle to act in combination to limit movement of the linkage.

* * * * *